US008390450B2

(12) United States Patent
August et al.

(10) Patent No.: US 8,390,450 B2
(45) Date of Patent: Mar. 5, 2013

(54) CELL PHONE DETECTION AND IDENTIFICATION

(75) Inventors: Jason August, Toronto (CA); James Cassidy, Waterloo (CA); Robert Griffin, Richmond Hill (CA); John K. Stevens, Stratham, NH (US); Paul Waterhouse, Copetown (CA)

(73) Assignee: Visible Assets, Inc., Mississauga, Ontario (CA)

( * ) Notice: Subject to any disclaimer, the term of this patent is extended or adjusted under 35 U.S.C. 154(b) by 1060 days.

(21) Appl. No.: 11/768,881

(22) Filed: Jun. 26, 2007

(65) Prior Publication Data

US 2009/0219156 A1 Sep. 3, 2009

Related U.S. Application Data

(60) Provisional application No. 60/816,998, filed on Jun. 28, 2006.

(51) Int. Cl.
*G08B 13/14* (2006.01)
*G08B 1/08* (2006.01)
*H04M 11/04* (2006.01)

(52) U.S. Cl. ............. 340/572.1; 340/575.2; 340/539.11; 340/539.13; 455/404.2; 455/410

(58) Field of Classification Search .................. 340/330, 340/539.13, 572.1; 455/404.2, 410
See application file for complete search history.

(56) References Cited

U.S. PATENT DOCUMENTS

| | | | | |
|---|---|---|---|---|
| 6,195,009 | B1 * | 2/2001 | Irizarry et al. | 340/573.4 |
| 6,933,848 | B1 * | 8/2005 | Stewart et al. | 340/572.3 |
| 6,956,480 | B2 * | 10/2005 | Jespersen | 340/568.1 |
| 7,049,963 | B2 * | 5/2006 | Waterhouse et al. | 340/572.1 |
| 7,259,673 | B2 * | 8/2007 | Deeds | 340/572.1 |
| 7,271,715 | B2 * | 9/2007 | Aupperle et al. | 340/539.13 |
| 2005/0121659 | A1 | 6/2005 | Tanaka et al. | |
| 2009/0313689 | A1 | 12/2009 | Nystr m et al. | |

* cited by examiner

*Primary Examiner* — Donnie Crosland
(74) *Attorney, Agent, or Firm* — Larson & Anderson, LLC

(57) ABSTRACT

A security tag affixed to a mobile phone for monitoring, tracking, and securing the mobile phone within a protected region. The security tag includes: a tag antenna operable at a low radio frequency not exceeding one megahertz; a tag transceiver operatively connected to the device antenna, the transceiver operable to receive radio signals at the low radio frequency and generate data signals at the said low radio frequency, in response thereto; and a microcontroller operatively coupled with the transceiver, the microcontroller being configured to cause the transceiver to emit a signal when the mobile phone is exiting the protected region.

43 Claims, 13 Drawing Sheets

CELL PHONE DETECTION AND IDENTIFICATION

CROSS-REFERENCE TO RELATED APPLICATIONS

This application claims priority from provisional U.S. Application Ser. No. 60/816,998, "Cell Phone Detection and Identification," filed on Jun. 28, 2006, and is related to U.S. application Ser. No. 11/633,751, filed Dec. 4, 2006, which is in turn a continuation-in-part of U.S. application Ser. No. 11/162,907, "RF Tags for Tracking and Locating Travel Bags," filed Sep. 28, 2005. This application also is related to U.S. application Ser. No. 11/462,844, "Networked RF Tag for Tracking Baggage," filed on Aug. 7, 2006. This application contains inventive material similar to and related to that contained in co-pending application Ser. No. 11/754,261, "Secure, Networked Portable Storage Device," filed May 25, 2007.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

Not Applicable.

TRADEMARKS

RuBee™ is a registered trademark of Visible Assets, Inc. of the United States. Other names used herein may be registered trademarks, trademarks or product names of Visible Assets, Inc. or other companies.

FIELD OF THE INVENTION

The invention disclosed broadly relates to the field of portable phones and more particularly relates to the field of securing and identifying portable phones.

BACKGROUND OF THE INVENTION

Los Alamos Laboratories and other high security Department of Energy (DOE) sites have placed a ban on cell phones within secure areas. Cell phones represent a major security risk. However, the wide prevalence of phones in everyday life has made enforcement of that ban difficult and many unintentional security breaches occur on regular basis.

Therefore, there is a need for a security device to overcome the aforementioned shortcomings of the known art.

SUMMARY OF THE INVENTION

According to an embodiment of the invention, a security tag is affixed to a mobile phone for monitoring, tracking, and securing the portable phone within a protected region. The security tag includes: a tag antenna operable at a low radio frequency not exceeding one megahertz; a tag transceiver operatively connected to the device antenna, the transceiver operable to receive radio signals at the low radio frequency and generate data signals at the said low radio frequency, in response thereto; and a microcontroller operatively coupled with the transceiver, the microcontroller being configured to cause the transceiver to emit a signal when the mobile phone is exiting the protected region.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 3:
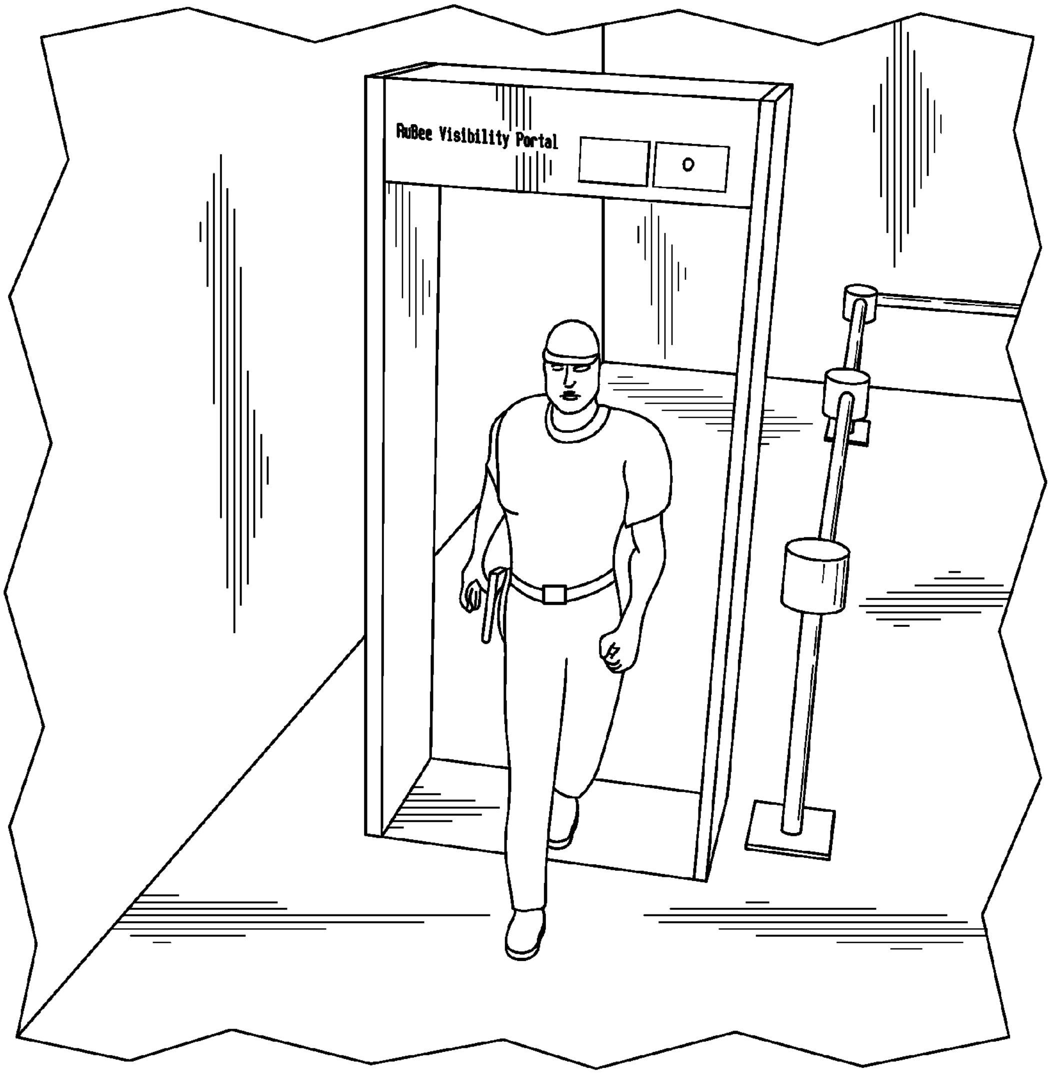
Figure 4:
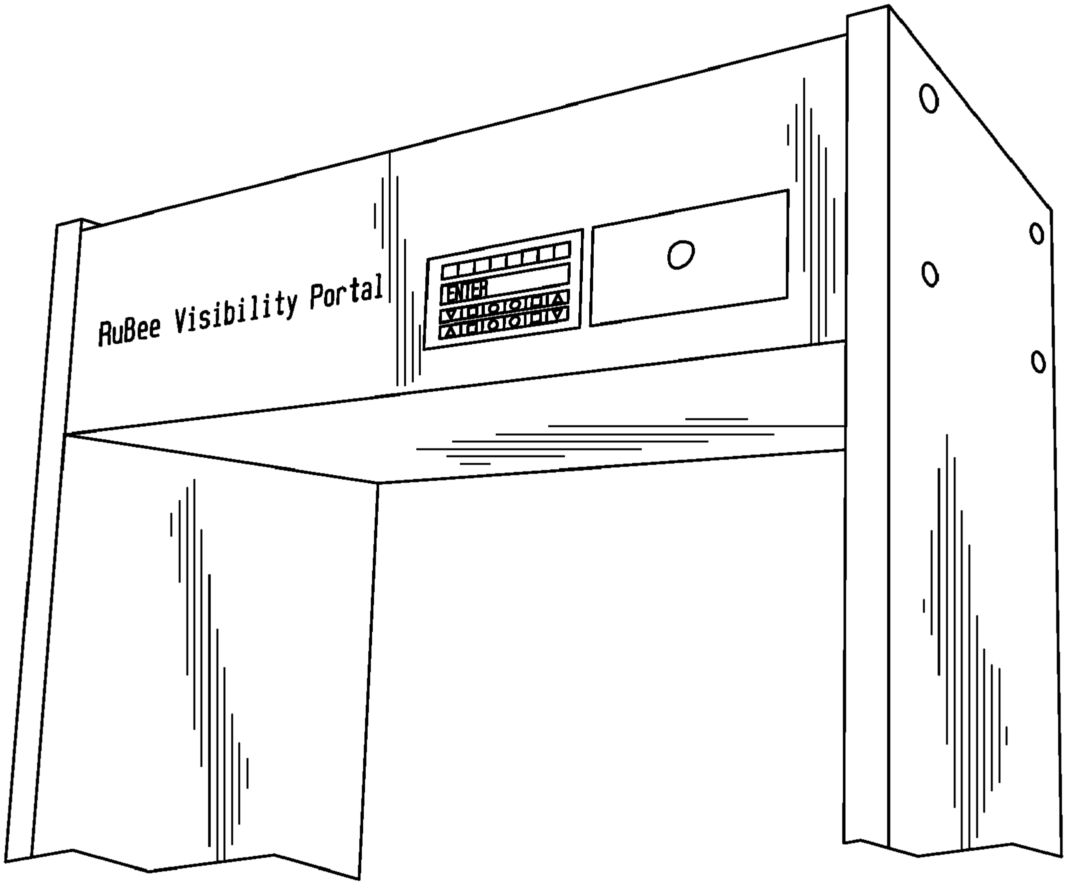
Figure 5:
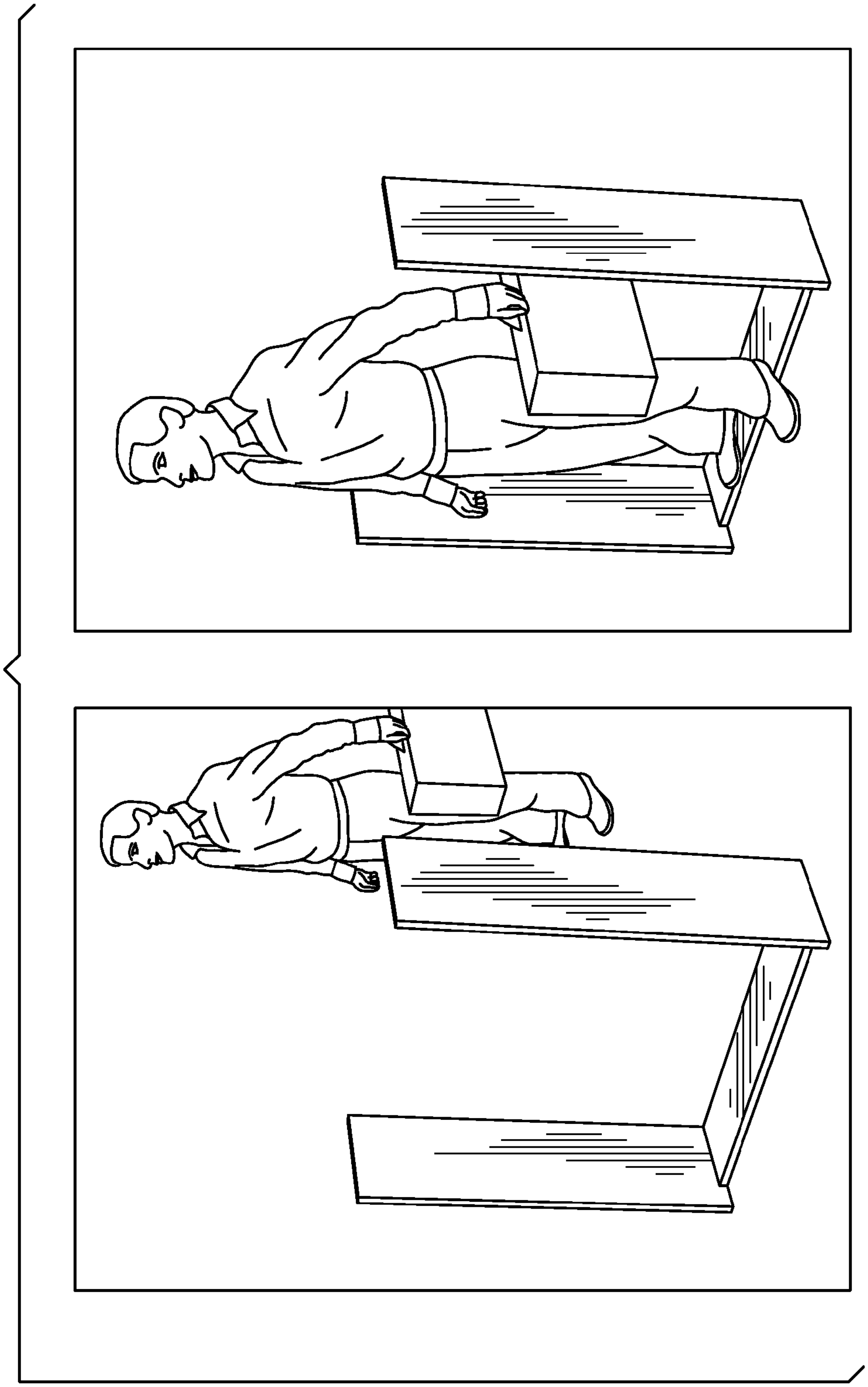
Figure 6:
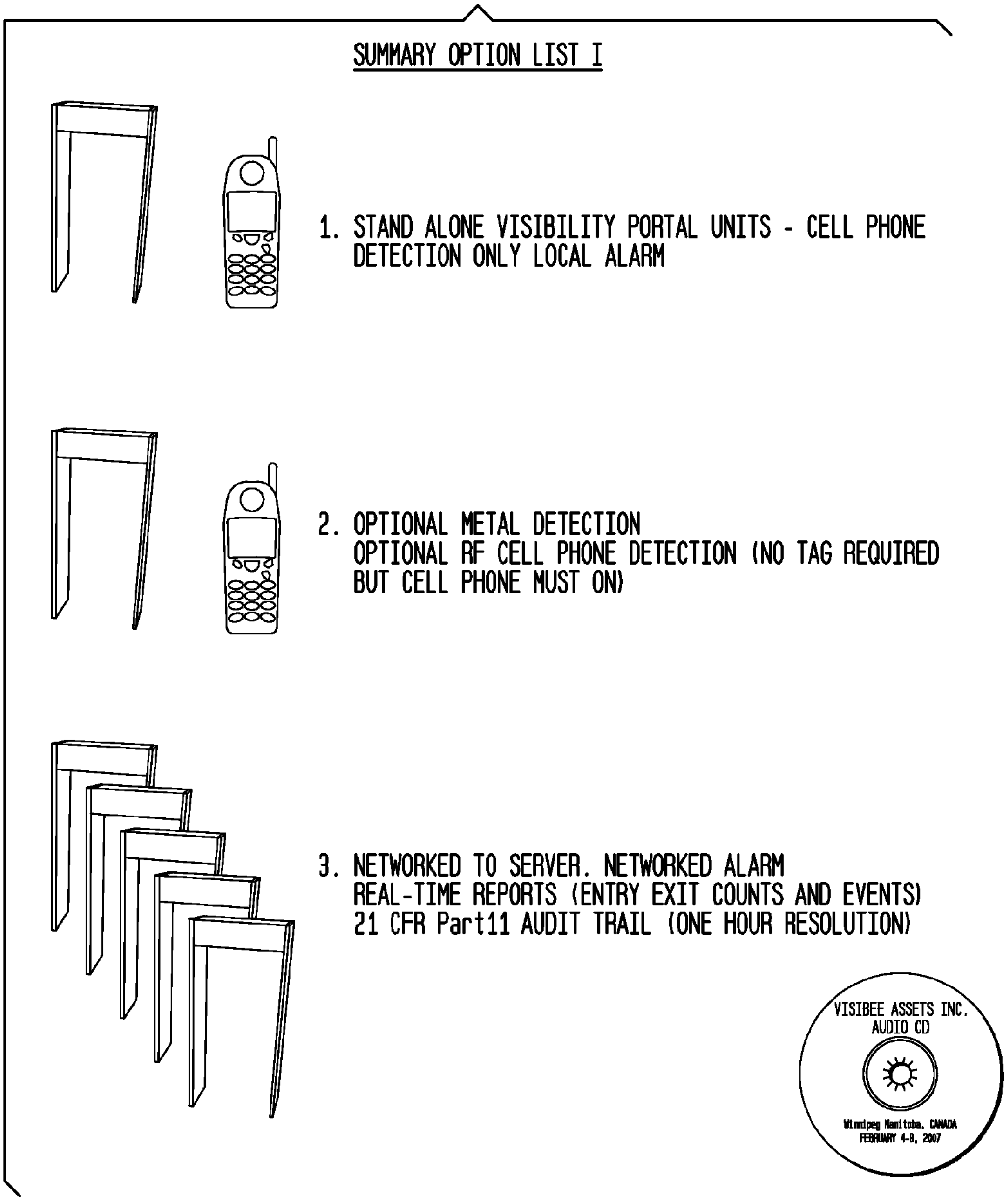
Figure 7:
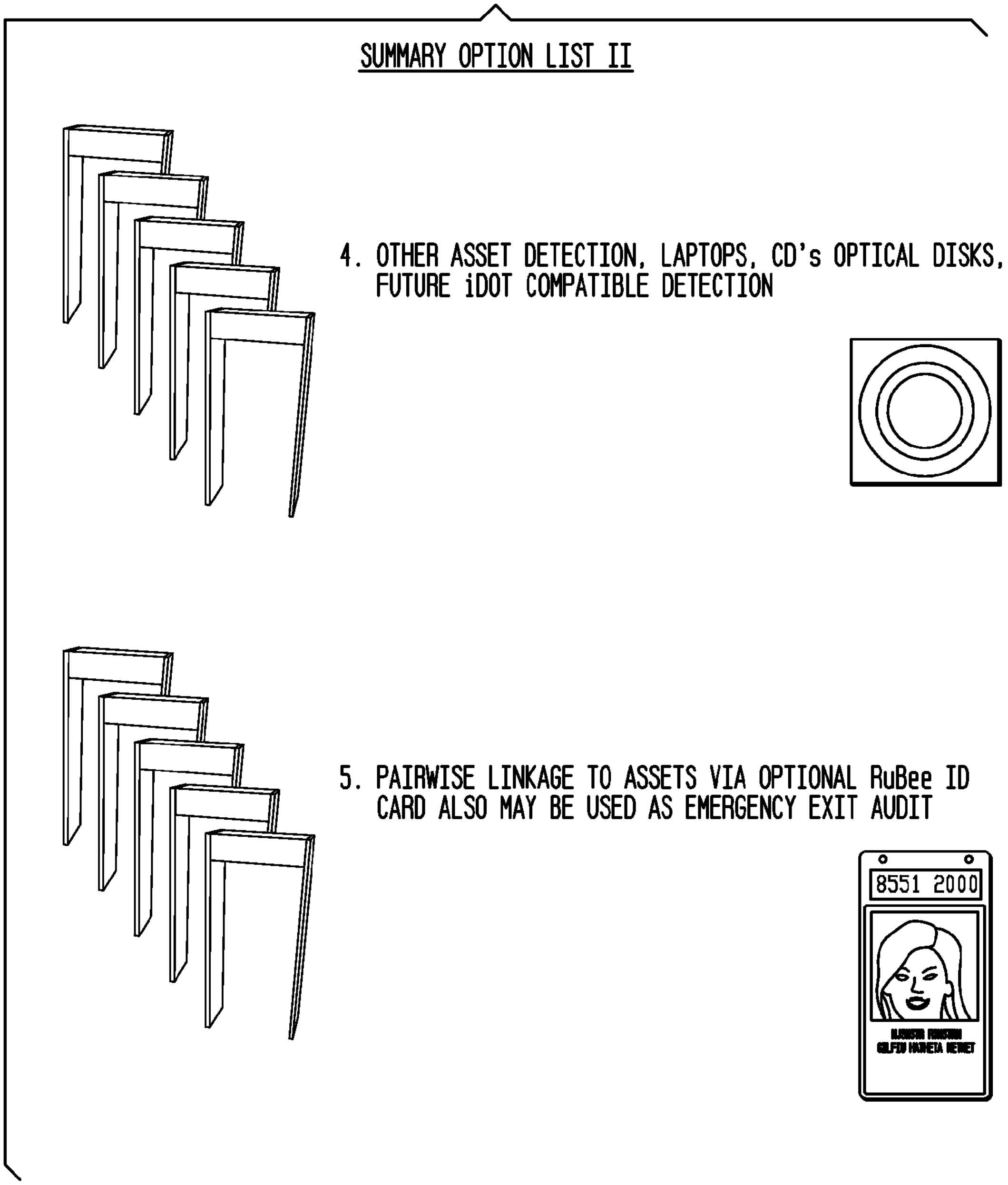

is an illustration of a visibility portal, according to an embodiment of the present invention;

FIG. 3 is an illustration of a visibility portal, according to an embodiment of the present invention;

FIG. 4 is an illustration of a visibility portal connected to a TCP/IP network with real-time reporting, according to an embodiment of the present invention;

FIG. 5 shows a portal with antennas and a person walking through the portal, according to an embodiment of the present invention;

FIG. 6 shows a summary option list, according to an embodiment of the present invention; and FIG. 7 shows another summary option list, according to an embodiment of the present invention.

Figure 8:
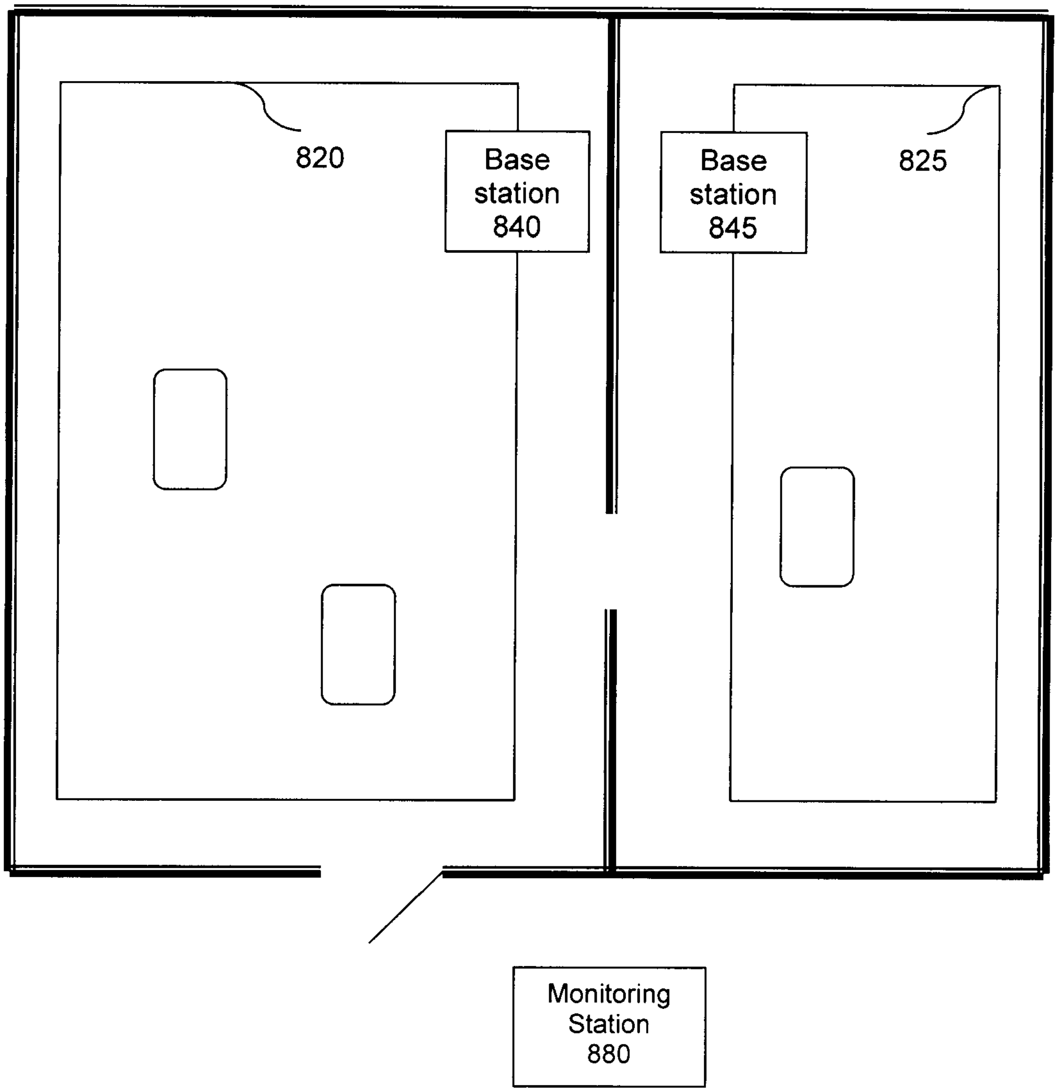
Figure 9:
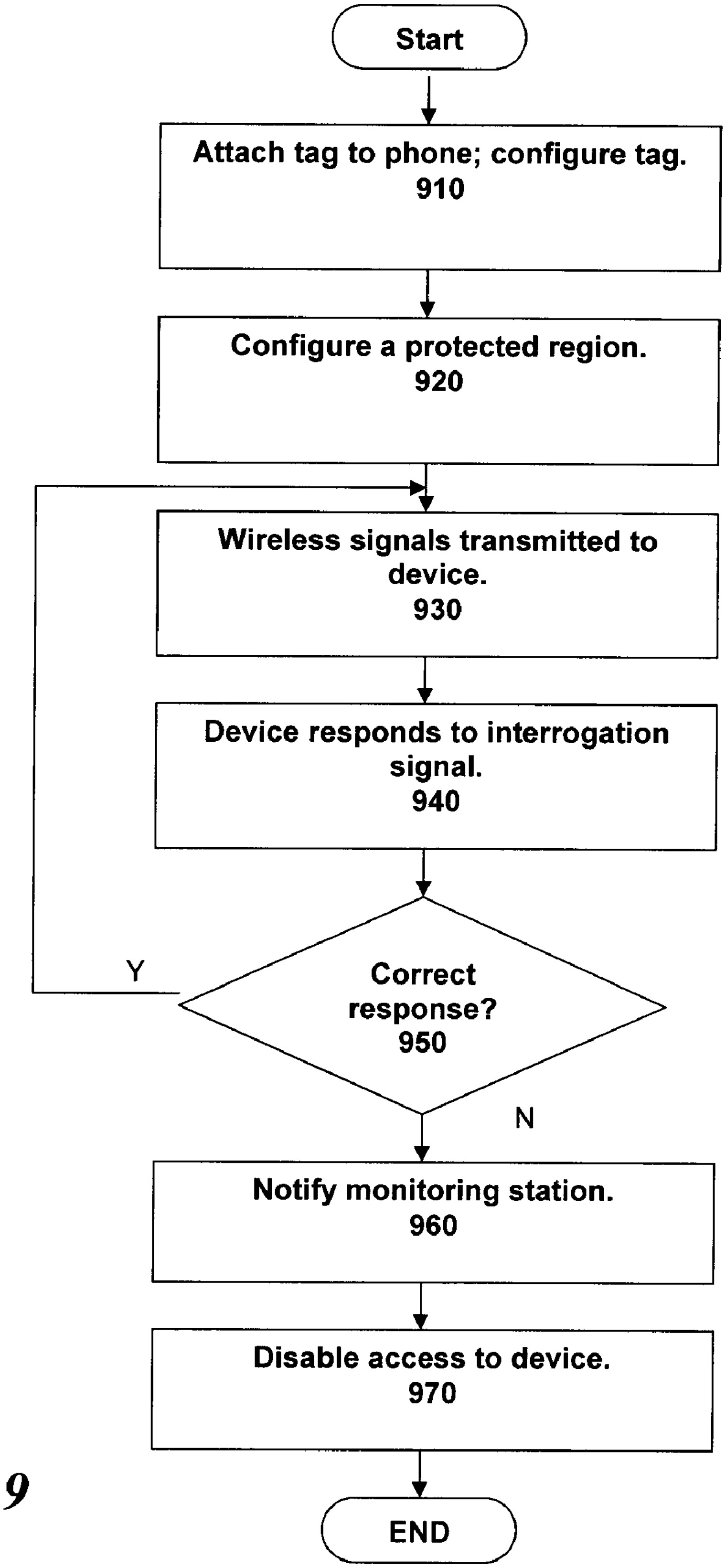
Figure 10:
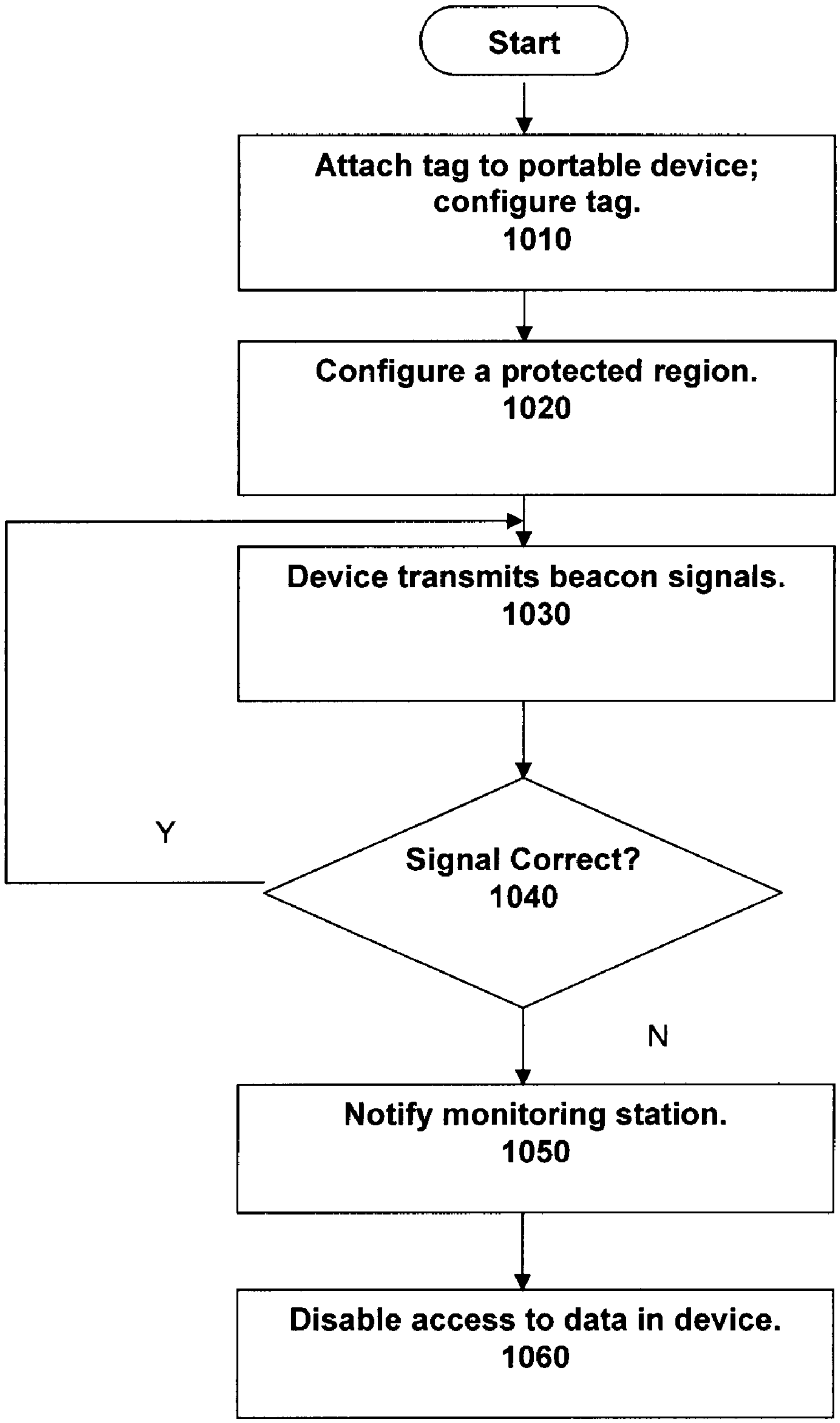
Figure 11:
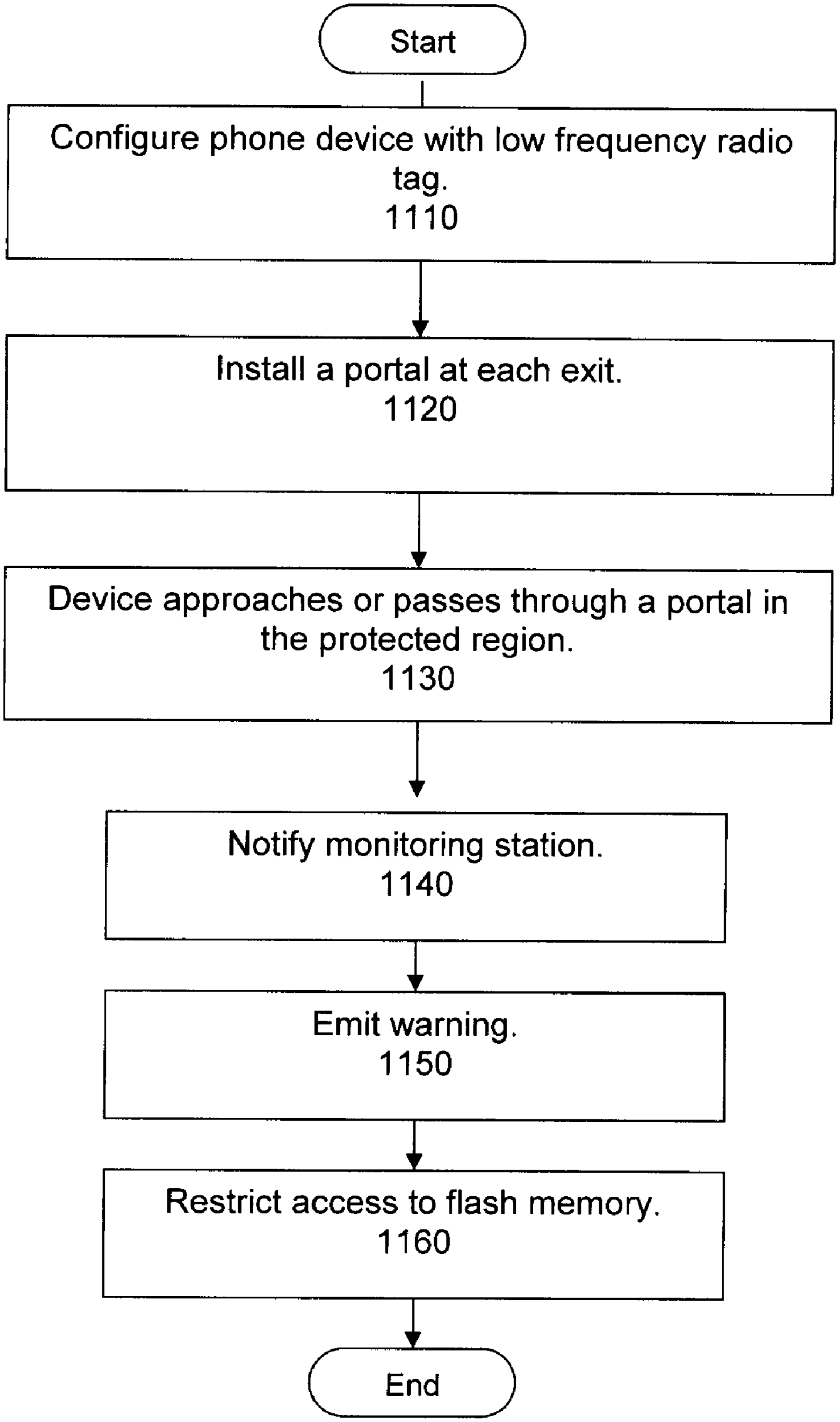
Figure 12:
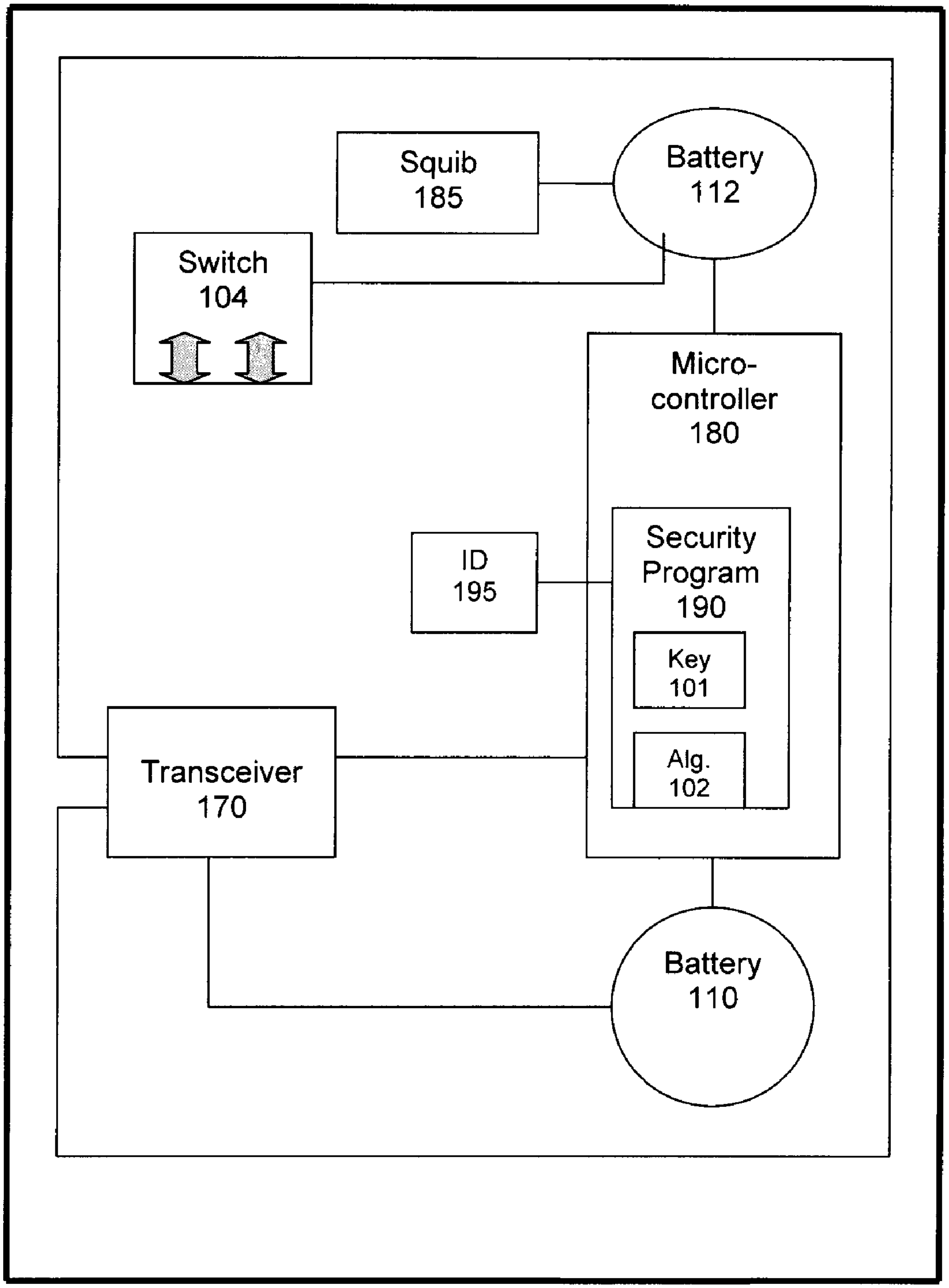

FIG. 8 is a simplified block diagram of a protected region wherein a mobile phone with an attached security tag may be advantageously used, according to an embodiment of the present invention;

FIG. 9 is a flowchart of a method for securing a portable computing device, according to an embodiment of the present invention;

FIG. 10 is a flowchart of another method for securing a portable computing device, according to an embodiment of the present invention;

FIG. 11 is a flow chart of a method for exit control using a portal, according to an embodiment of the present invention; and FIG. 12 is a portable device with an additional battery, according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

RuBee™, a long wavelength magnetic data transfer protocol, is now used as a real-time visibility system in the areas of healthcare (medical devices) and Livestock. RuBee has the advantage of controlled, limited range, immunity from signal loss due to water, and limited signal loss due to steel or other conductive metals. RuBee is capable of asset detection, asset identification, as well as pair wise linkage with RuBee™ enabled identity cards.

RuBee™ can also be used to deter and prevent cell phone entry into high security areas providing the phones have an attached RuBee™ tag. The system detects and identifies cell phones even if enclosed inside an aluminum briefcase.

A solution to the problem of unauthorized removal of a portable phone from a secure region is discussed with reference to the figures. According to an embodiment of the present invention, a portable phone is secured using a low frequency radio tag configured with the RuBee™ IEEE P1902.1 "RuBee Standard for Long Wavelength Network Protocol" to safeguard the phone. It may be desirable to safeguard the phone so as to protect data contained in the phone, such as data in the phone's memory. There are many reasons why a user of the phone or an administrator in an office where the phone is used may need to keep the phone protected from unauthorized access. For example, the data in the phone may be of a personal nature, or it may be subject to strict confidentiality and audit trail protocols, such as data in a medical file. The latter reason is most commonly found in governmental offices, the healthcare industry, the military and corporations that do business with the government, hospitals, and/or the military.

The phone as will be described herein can be configured as part of a network and can be operable to receive and transmit signals to/from other computing devices within the network, whether those devices are portable or not. See "Networked Ear Tags for Tracking Animals," application Ser. No. 11/735,959, filed on Apr. 16, 2007. See also "Two-Tiered Networked Identification Cards," Application Ser. No. 60/889,902, filed on Feb. 14, 2007. See also co-pending "Secure, Networked Portable Storage Device," application Ser. No. 11/754,261, filed on May 25, 2007.

The method for securing a portable phone as will be described herein enables the protection/tracking/control of phones within a secured network, using low frequencies. A secured network can be any portion of any building, classified site or other region wherein the phones may be securely used. The protection/tracking/control capabilities within the secured network are not hampered by any surrounding metal, water and masonry which can interfere with reliable transmissions at high frequencies. To understand how the security features are enabled, we discuss the RuBee™ long wavelength network protocol.

RuBee™ Tag Technology.

Radio tags communicate via magnetic (inductive communication) or electric radio communication to a base station or reader, or to another radio tag. A RuBee™ radio tag works through water and other bodily fluids, and near steel, with an eight to fifteen foot range, a five to ten-year battery life, and three million reads/writes. It operates at 132 kHz and is a full on-demand peer-to-peer, radiating transceiver.

RuBee™ is a bidirectional, on-demand, peer-to-peer transceiver protocol operating at wavelengths below 450 kHz (low frequency). A transceiver is a radiating radio tag that actively receives digital data and actively transmits data by providing power to an antenna. A transceiver may be active or passive.

Low frequency (LF), active radiating transceiver tags are especially useful for visibility and for tracking both inanimate and animate objects with large area loop antennas over other more expensive active radiating transponder high frequency (HF)/ultra high frequency (UHF) tags. These LF tags function well in harsh environments, near water and steel, and may have full two-way digital communications protocol, digital static memory and optional processing ability, sensors with memory, and ranges of up to 100 feet. The active radiating transceiver tags can be far less costly than other active transceiver tags (many under one US dollar), and often less costly than passive back-scattered transponder RFID tags, especially those that require memory and make use of an EEPROM. With an optional on-board crystal, these low frequency radiating transceiver tags also provide a high level of security by providing a date-time stamp, making full AES (Advanced Encryption Standard) encryption and one-time pad ciphers possible.

One of the advantages of the RuBee™ tags is that they can receive and transmit well through water and near steel. This is because RuBee™ operates at a low frequency. Low frequency radio tags are immune to nulls often found near steel and liquids, as in high frequency and ultra high-frequency tags. This makes them ideally suited for use in office environments where metal is commonly used in shelving and in construction. Fluids have also posed significant problems for current tags. The RuBee™ tag works well through water. In fact, tests have shown that the RuBee™ tags work well even when fully submerged in water. This is not true for any frequency above 1 MHz. Radio signals in the 13.56 MHz range have losses of over 50% in signal strength as a result of water, and anything over 30 MHz have losses of 99%.

Another advantage is that RuBee™ tags can be networked. One tag is operable to send and receive radio signals from another tag within the network or to a reader. The reader itself is operable to receive signals from all of the tags within the network. These networks operate at long-wavelengths and accommodate low-cost radio tags at ranges to 100 feet. The standard, IEEE P1902.1™, "RuBee Standard for Long Wavelength Network Protocol", allows for networks encompassing thousands of radio tags operating below 450 kHz.

The inductive mode of the RuBee™ tag uses low frequencies, 3-30 kHz VLF or the Myriametric frequency range, 30-300 kHz LF in the Kilometric range, with some in the 300-3000 kHz MF or Hectometric range (usually under 450 kHz). Since the wavelength is so long at these low frequencies, over 99% of the radiated energy is magnetic, as opposed to a radiated electric field. Because most of the energy is magnetic, antennas are significantly (10 to 1000 times) smaller than ¼ wavelength or 1/10 wavelength, which would be required to efficiently radiate an electrical field. This is the preferred mode.

As opposed to the inductive mode radiation above, the electromagnetic mode uses frequencies above 3000 kHz in the Hectometric range, typically 8-900 MHz, where the majority of the radiated energy generated or detected may come from the electric field, and a ¼ or 1/10 wavelength antenna or design is often possible and utilized. The majority of radiated and detected energy is an electric field.

RuBee™ tags are also programmable, unlike RFID tags. The RuBee™ tags may be programmed with additional data and processing capabilities to allow them to respond to sensor-detected events and to other tags within a network.

Cell Phone Detection and Identification.

Figure 1A:
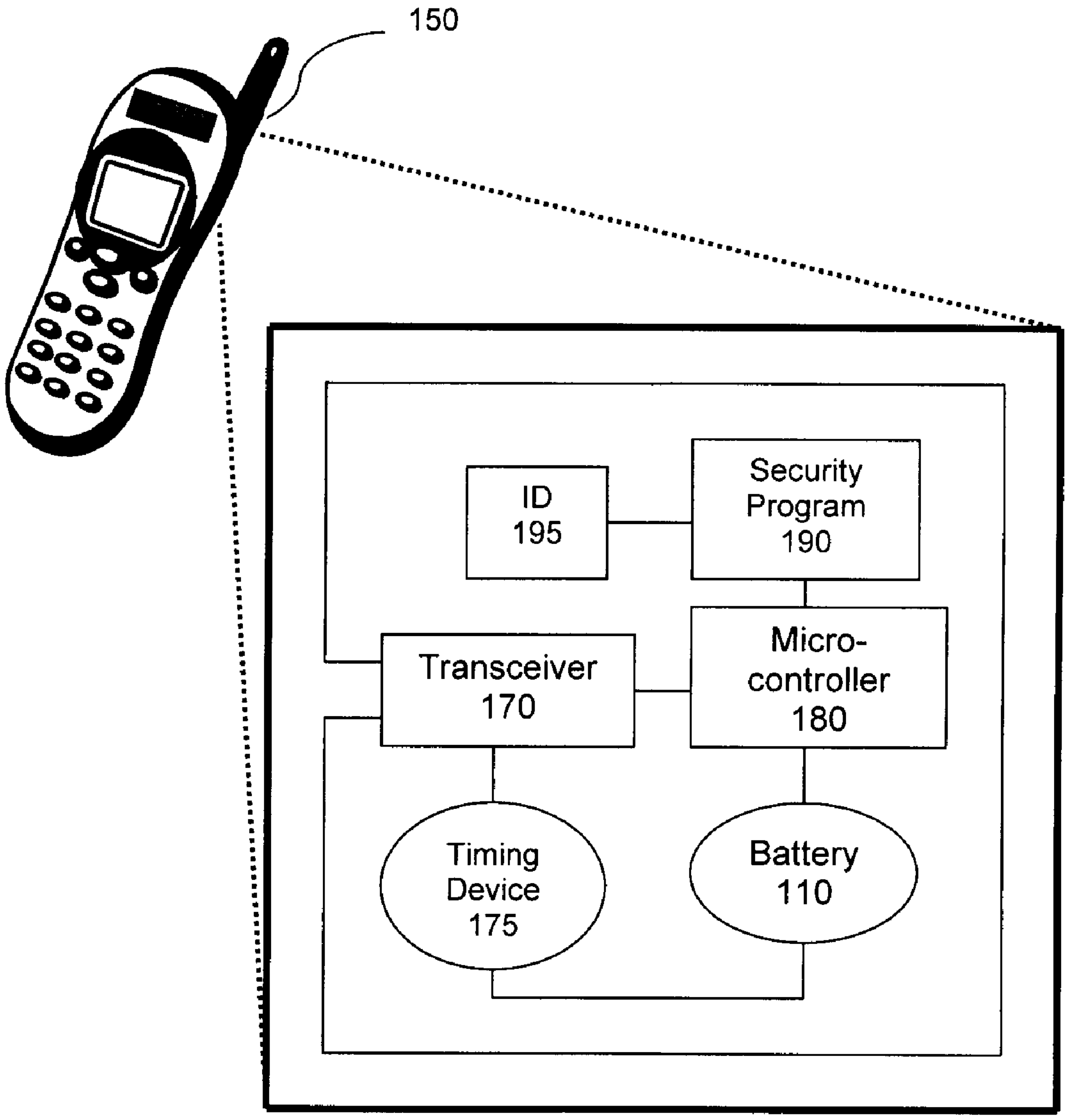
FIG. 1*a* is an illustration of a cell phone with an attached RuBee™ tag, according to an embodiment of the present invention.
Figure 2:
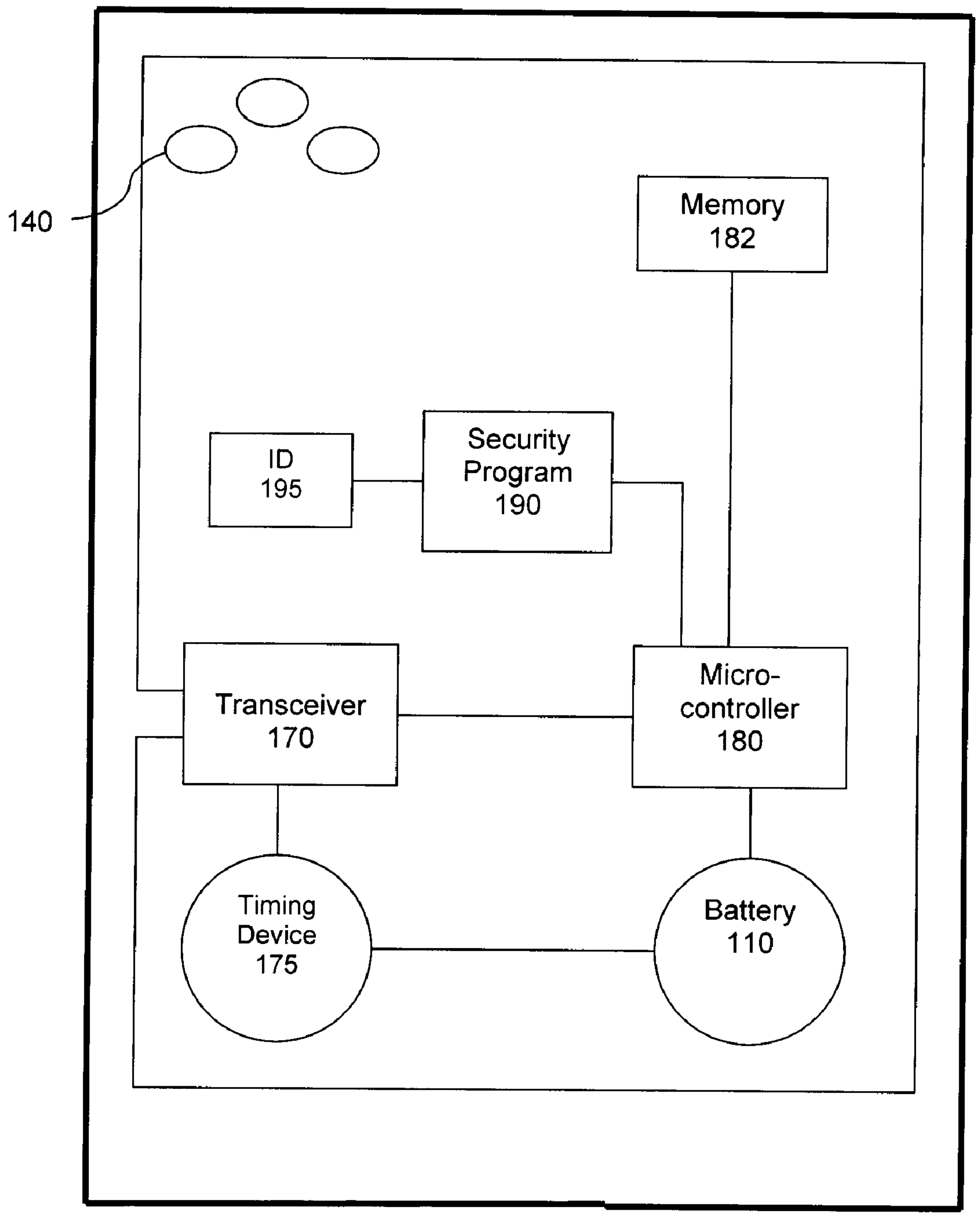
FIG. 2 is a simplified block diagram of a security tag with both standard and optional components, according to an embodiment of the present invention.

Referring now in specific detail to the drawings, and particularly FIG. 1*a*, there is illustrated an exemplary portable phone 100 according to an embodiment of the present invention. The phone 100 includes the standard components found in most cellular phones. In order to monitor, track, and secure the phone 100, a RuBee™-enabled security tag 150 is affixed to the phone 100. The security tag 150 can be affixed to the outside housing of the phone 100 or stored inside the phone 100. The tag 150 contains the following components, as shown in FIG. 2:

RuBee™ transceiver 170. The transceiver 170 is operatively connected to the antenna 160 and the microcontroller 180. The transceiver 170 is preferably a custom radiofrequency modem, created on a custom integrated circuit using 4 micron complementary metal oxide semiconductor (CMOS) technology designed to communicate (transmit and receive radio signals) through the omni-directional loop antenna 160. All communications take place at very low frequencies, under 300 kHz, and possibly as low as 180 kHz. By using very low frequencies the range of the tag 150 is somewhat limited; however power consumption is also greatly reduced. Thus, the receiver 170 may be on at all times and hundreds of thousands of communication transactions can take place, while maintaining a life of many years (up to 15 years) for the battery 110. The range of the transceiver 170 can be augmented by the use of field antennas.

A microprocessor or microcontroller 180 controls the operation of the security program 190. The microcontroller 180 may be a standard original equipment manufacture (OEM) microprocessor. It may be created on a custom integrated circuit using four micron CMOS (complementary metal-oxide semiconductor) technology. The microcontroller 180 is operatively connected to the transceiver 170, and the security program 190. It has the ability to detect and read analog voltages from various optional detectors.

A security program 190 is operatively connected to the microcontroller 180. The security program 190 contains program code instructions to provide security for the phone 100. The program code instructions may be customized by a user in order to perform functions including, but not limited to: 1) allow a user to make calls on the phone 100; 2) prevent a user from making calls on the phone 100; 3) disable the other phone components, such as a camera, web browser, and so on; 4) provide identification data when requested.

The security program 190 may be embodied as program code instructions embedded in a control program, or it may be a separate application. The security program 190 may be embodied as software only, hardware, or firmware. The security program 190 may be embodied as an application specific integrated circuit (ASIC). There may be more than one security program 190 to handle different security measures. For example, one security program is strictly for disabling the phone 100 and one security program monitors access requests. The components may be placed in any number of configurations.

Figure 1B:
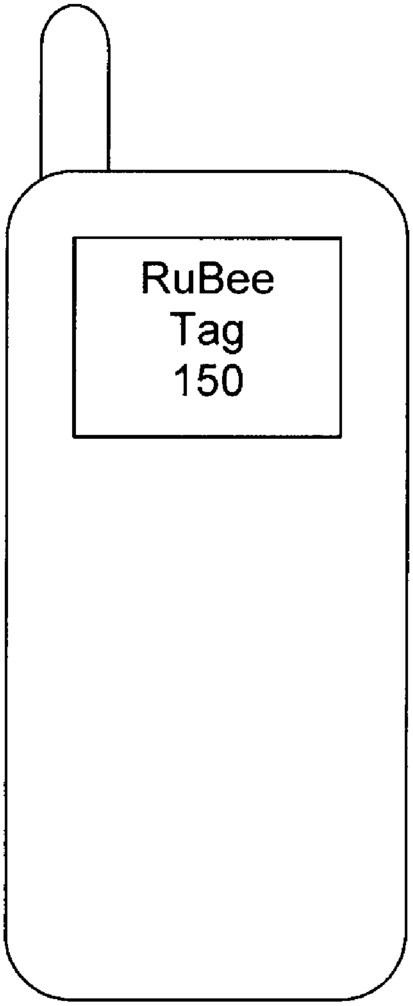
FIG. 1*b* shows a back view of the cell phone of FIG. 1*a*, according to an embodiment of the present invention.

The energy source 110 for the tag 150 may be a battery (e.g., battery, solar cell, and induction coil/rectifier) operable to energize the transceiver 170 and the microcontroller 180 as well as to enhance the power of the transmission to and from a reader. The battery 110 as shown in FIG. 1*b* is preferably a lithium (Li) CR2525 battery approximately the size of an American quarter-dollar with a five to fifteen year life and up to three million read/writes. Note that only one example of an energy source is shown. The tag 150 is not limited to any particular source of energy; the only requirement is that the energy source is small in size, lightweight, and operable for powering the electrical components. The battery 110 may also serve to power optional components such as sensors.

Tag antenna 160. The antenna 160 is a small omni-directional loop antenna with an approximate range of eight to fifteen feet. It is preferably a thin-gauge wire wrapped many times around the inside edge of the tag housing. A reader or monitor may be placed anywhere within that range in order to read signals transmitted from the tag 150. If data is stored in the tag 150, the tag 150 may use metal gate CMOS or optionally silicon gate CMOS technology, since it operates at such a low frequency. In most cases the cost of the battery (6 cents), and an optional crystal (4 cents) and CMOS chip (5-10 cents) is less than an EEPROM chip with less than 24 bytes of memory.

Optional Components.

On-board memory 182 may be used to store data about events. In combination with a crystal, the memory 182 may store a temporal history of status events tied to a timestamp, as is well-known in the art.

A timing device 175 is used to activate the transceiver 170 at selected time intervals to detect a presence of low frequency radio signals. The timing device 175 may also be used by the transceiver 170 to emit low frequency radio signals at predetermined time intervals.

The timing device 175 may be a crystal. The crystal 175 may be used to provide a frequency reference. In a preferred embodiment we use a 32 kHz crystal commonly used in watches or devices that require a timing standard. This is used as a frequency reference for transmission of date and time. The crystal 175 serves as a timing reference or clock for recording date and time. This makes it possible for the tag 150 to create logs and records of activity and other parameters. It also provides for a dynamic proof of content that can be changed periodically. The crystal 175 also provides for the ability for the tag 150 to become an "on demand" client to transmit when a specific condition is met or an optional sensor value is exceeded without the need of a reference carrier. The crystal frequency may be multiplied four times to achieve a transmission frequency of 128 kHz.

The crystal 175 also provides for random phase modulation. Passive and other active tags all use a transponder mode and use carrier frequency as a reference. Thus, the crystal 175 is viewed as unnecessary in other tags and is eliminated to save cost and space. However, the crystal 175 as used in the security tag 150 provides for the ability to selectively read one tag 150 within an area, without prior knowledge of its ID. This random phase and "network discovery" is enabled by the use of the crystal 175 as opposed to anti-collision methods used in other radio tags.

Sensors 140. In addition, low cost detectors 140 for environmental parameters (humidity, angle, temperature) and activity parameters (acceleration and jogs) and an on-board GPS (global positioning system) sensor may be easily added to the security tag 150 as needed. With the addition of internal memory 182 such as a data storage device, data associated with these detectors 140 may be logged over time and stored in the tag 150 for reading and documenting the history of the phone 100. More importantly these electronic tags 150 could provide detailed times and dates when any data parameter changed or an action took place. For example, it is possible to identify the location and the precise time when the phone 100, was dropped or moved from its location. The use of a sensor 140 for detecting movement is highly recommended for a security tag 150 that is affixed to the outside of the phone 100.

An advantage of this tag 150 is its ability to transmit to a base station, independent of the base station interrogating the tag 150. This on-demand tag transmission makes it possible for the tag 150 to transmit an alarm signal to the base station when a sensor 140 detects certain conditions, such as the phone 100 being moved.

An optional identification storage element 195 may be included within the security program 190 or operatively connected to the program 190 as shown in FIG. 2. This storage element 195 stores an identification code identifying the phone 100. The identification code may also optionally identify the organization or project for which the phone is being used and/or the phone user. The identification code may be hardwired into the storage element 195 or the security program 190 or it may be programmatically inserted as software by the microcontroller 180 after receiving the code signal from a trusted source. This identification code 195 may contain a unique identifier for the phone 100 and it may also contain a network identifier.

This identifier is required when communicating within a network of portable phones and in particular so that devices can communicate with each other with some degree of certainty that they are communicating with a trusted device. The transceiver 170 is operable to wirelessly transmit the identification code to a requesting entity such as a monitoring station.

Each security tag 150 may have many IDs programmed into its memory. A handheld or a special programming device (a base station) connected to a computer with limited range, sends out a unique ID. The tag 150 has an always-on receiver and reads the transmitted ID, it compares this with the IDs contained in its memory and if it finds a match, transmits a signal containing the transmitted ID back to the transmitter, indicating that it is now fully open to handle communication. The base station may then provide the security tag 150 with one or more unique ID numbers which may simply be a unique tracking number, or other unique ID, as well as any information it may require to function (e.g. instructions to log temperature or physical impacts such as jogs). The tag 150 is also provided with several random numbers stored in its memory that can be used to delay un-solicited transmissions to the base station to minimize likelihood of collisions.

Protected Region.

According to a preferred embodiment, the phone 100 is fully operable when used within a protected region, such as a building, provided with a signal generating system operable to generate a low frequency radio signal not exceeding one megahertz throughout substantially the entirety of said protected region by radiating said low frequency radio signal from at least one field antenna which is driven by a base station. The protected region may be as small as a desk area, a single office or lab, or as large as a multi-building complex. The size of the protected region can be increased exponentially with the addition of field antennas and base stations.

Referring to FIG. 8 there is shown an exemplary illustration of a protected region wherein the portable device 100 may be advantageously used. In this protected region 800 (shown here as a building) there are four networked phones. Three phones are shown within the protected region 800. Also shown is a signal generating system that includes field antennas 820 and 825. These field antennas are in communication with base stations 840 and 845. The field antennas are basically large loop antennas that can be placed around the perimeter of the office, or around shelving. They may be made from medium gauge wire (10-12 gauge) with several turns around the loop. The transmission distance of the tag 150 can be controlled by the size of the loop. For example the loop may be small, a foot by one foot, and a tag 150 may be read or written to within that area and within several feet surrounding the area. Alternatively, the loop may cover a large area, 100×100 feet for example. In this case the security tag 150 may be read or written to anywhere within the 100 sq. foot area, as well as 20 to 30 feet beyond the loop's edge outside of the central area. It will be understood that the placement of the field antennas 820 and 825 shown in FIG. 8 are exemplary and are not meant to restrict the scope of the invention to this particular placement and configuration of field antennas.

Field antennas may be placed horizontally, vertically, in and around metal shelving, walls and workstations, under carpeting and above ceiling tiles. They may be placed around a doorway. In another embodiment the antenna may be placed horizontally either on a floor or ceiling within a building or even an outdoor area. The RuBee™ low frequency signals are ideal for this configuration because the metal in door jambs or walls will not interfere with the signals as they would with RFID. For aesthetic reasons, the field antennas 820 and 825 can be placed so that they are hidden from view, without losing transmission strength.

The base stations 840 and 845 generate a low frequency radio signal (less than one megahertz) throughout the entire protected region 800. The protected devices can respond to these signals by emitting radio signals less than 300 megahertz. The number of base stations and field antennas can be increased or decreased depending on the amount of area to protect. The example of FIG. 8 depicts a configuration similar to that which would be used in a medium-size office. A monitoring station 880 such as a server with web access monitors the phones within the protected region 800. The monitoring station 880 may be located outside of the protected region 300. The status of the phones within the secure area 800 may be monitored by security personnel outside of the secure area 800 via an intranet or through the Internet. A server may be used to track all portable devices and issue alerts if a security event is detected, such as the device exiting the secure area 800.

The base station 840, or router, is a custom RuBee™ router. It consists of some basic logic circuitry, a radio modem circuit, and an antenna. RuBee™ routers are designed to read data from multiple antennas at a low frequency. The base station 840 may be configured with a built-in GPS unit, multiple USB ports, a serial port and high-speed Ethernet connection for communication with a central data processor or monitoring station 880. This configuration has the added benefit that not only does it track and protect the portable devices, but it can enable any data stored in the memory 182 of the phones to be accessed remotely via a web-enabled computer 880.

At any point in time, data stored in any of the phones within the network can be accessed real-time through a web browser. One with knowledge in the art can understand that the data may also be encrypted and/or password-protected so that only authorized users may access the data through the web browser. The data can be protected by assigning a personal identification number (PIN) so that only those users with the PIN can access the data. Alternatively, the data may be encrypted with Advanced Encryption Standard (AES) encryption. Only authorized personnel would have the key to decrypt the data.

The base station 840 in the office 800 communicates with the many tags located in the office via a tuned loop antenna 820. A server optionally attached to the base station 840 sends as part of its transmission the tracking number or unique ID to the entire network of tags, and that number is compared by each tag to the numbers contained in each tag's memory. If the tag 150 does find a match for the transmitted number, then the tag 150 replies to the interrogation with that serial number or with the same ID or tracking number. Provided the numbers are unique only a single tag will reply, and full hand-shake communication can be carried out between the tag 150 and the base station 840. At the end of the transmission, the base station 840 sends a code to indicate it has completed all communication. The server 880 can do a check-up on all tags by simply polling each tag one after the other with its ID in the same manner as outlined above. The base station 840 may also read and/or harvest any logs stored in the individual tag's memory 182.

The security tags 150 may also initiate communication, by transmitting their ID's to the base station 840. This could be in response to sensor 140 activation or other event. In the rare case when two tags simultaneously transmit, the IDs will be non-readable and the base station 840 will send out a signal indicating an error has occurred. Two possible protocols may be initiated. The tags may be instructed to re-transmit, using a random delay stored in each tag's memory register, to eliminate the overlap. Alternatively, that server may simply poll all security tags in the field, one-by-one, until it locates the two tags that transmitted the signals.

Visibility Portal.

Referring to FIG. 3 there is illustrated a RuBee™ Visibility Portal (RVP). The RVP may be placed at any entrance or exit of a building. In a basic embodiment of the present invention, the portal is used to detect the presence of cell phones. If a tagged phone attempts to enter the portal area we provide an alarm. The alarm may be an audible alarm, a visual alarm, or a combination of both.

In another embodiment of the present invention, the portal may optionally be used to detect a cell phone and identify that cell phone's owner, and provide a real-time data base of all event transactions. This identification is based on data contained in the tag identification storage element 195.

The portal may optionally be used to provide a real-time network-based reporting of all events, including a 21 CFR Part 11 audit trail of all events.

Pair Wise Linkage.

The portal may optionally be used to identify other assets (e.g. laptops, brief cases) entering or leaving the facility, as well as the identity of a person removing the asset or entering with the asset (through pair wise linkage). Again real-time reporting of events is optionally possible, as well as 21 CFR Part 11 audit trails of all events. With pair wise linkage it is possible to map data from a security tag 150 with data from a security tag in an identification card. See "Low Frequency Wireless Identification Device," application Ser. No. 11/633,751. This enables a host of different methods of security. The portal may be configured to emit an alarm if it detects a cell phone security tag exiting without its associated identification tag. Also, the portal may be configured to read the identification data from the cell phone tag 150 and match it to the identification tag. If the two do not match, the portal emits an alarm. Employing pair wise linkage in this manner allows for a more sophisticated security system.

FIG. 4 shows a visibility portal that is connected to a TCP/IP network with a real-time reporting, 21 CFR Part 11 audit trail, and event logs and visual and audible alarms and a simple control panel FIG. 5 shows a portal with antennas and a person carrying an aluminum brief case with a cell phone inside walking through the portal. Signals can be successfully transmitted through aluminum.

FIG. 6 is a summary option list 1 and FIG. 7 is a summary option list 2.

Embodiment Methods

Referring to FIG. 9 there is shown a flow chart 900 detailing a process of securing the phone 100 in the protected region 800 according to an embodiment of the present invention. The first two steps of the method can be performed in any order. The ordering is not important. Step 910 is to configure a phone with a RuBee™ tag 150. Configuring the phone may mean installing the tag 150 inside the phone 100 (the preferred method) or affixing the tag 150 to the outside of the phone 100.

Step 920 sets up at least one base station and at least one field antenna in the region to be protected. Any area surrounded by a field antenna is considered a protected region. The field antenna may be a loop antenna placed horizontally on the ground, on the ceiling, or around shelving or other structures. The field antenna may also be placed vertically, perhaps along a column or a room divider. The field antenna may also be placed outdoors, perhaps at the outside exit to a building, or a courtyard between buildings.

In step 930, the phone 100 receives wireless signals from base station 840. The base station 840 may continually radiate interrogation signals (chirps) followed by a listening interval. In another mode the base station 840 radiates interrogation signals intermittently, in burst mode. The signals may be requesting identification information 195 from the phones. The phone receives an interrogation signal which it has been preprogrammed to accept. The phone responds to the interrogation signal with a preprogrammed response. The response may simply be an acknowledgment signal or some identifying information.

In step 940 phones within range of the interrogation signal respond to the interrogation signal. The perimeter of the protected region 800 is set up so that any tag 150 within that perimeter is within range of an interrogation signal. If the signals from the phones are found to be acceptable in step 950, then nothing occurs and the process loops back to step 930. If, however, the base station 840 receives an incorrect response or no response at all from any of the phones, then in step 960 the base station transmits a signal to a monitoring station 880. The monitoring station 880 may then issue a directive to disable any access to the data contained in the non-responding phone device 100 in step 970. Note that step 970 is an optional step. Rather than involve the monitoring station 880, the base station 840 may be programmed to emit the directive to cause the data in the device 100 to be disabled if no response is received, or if the correct response is not received. For expediency, it may be convenient to bypass the step of notifying the monitoring station 880; but by bypassing the monitoring station 880, you may lose the opportunity to acquire some data about the non-responding device 100.

The data may be disabled remotely and wirelessly by activating a squib 185 sensitive to electromagnetic signals, as discussed earlier. The squib 185 destroys the stored data when activated. Therefore, by using a squib 185, any removal of the phone 100 from a protected area 300 causes the data to become useless.

Referring now to FIG. 10, we provide a flow chart 600 representing an alternate method for securing data in the portable device 100. In this embodiment, the first two steps 610 and 620 are the same as the first two steps of FIG. 9. In step 630, the tag 150 emits a low frequency identification beacon signal at timed intervals, using the timing device 175. The low frequency signals (under 150 kHz) are picked up by the field antennas. These beacon signals emitted from each device provide identity information (which may or may not be encoded). This information can be stored or displayed by the monitoring station 880.

The base station 840 is programmed to expect the beacon signal at certain intervals. The base station 840 also has a timer synchronized with the timer 175 of the tag 150.

In step 640 if the pre-determined period of time has elapsed and no signal has been received from the tag 150, then in step 650 the base station 340 will notify the monitoring station 880 to restrict access to the laptop data. Or, in the alternative, as discussed earlier, the base station 840 may be operable to disable the device 100. In step 660 the tag 150 receives a directive to restrict access to the data in the device 100. Just as in FIG. 8, the step of notifying the monitoring station 880 is an optional step.

The beacon signal can provide identifying information for the portable device 100. Using directional antennas and an optional GPS system with a GPS sensor 140 located on the tag 150, the specific location of the device 100 can be computed. This information may be sent to the monitoring station 880 or to a security system where it is stored.

In a preferred embodiment of the present invention, a simple timing method can be used to assure that access to the phone 100 is enabled only within the protected region 800. This embodiment requires that the tag 150 include a switch 104. The tag 150 is pre-programmed to maintain the switch 104 or flag setting for a preset interval of time, perhaps 30 seconds, responsive to a signal from the base station 840. This switch setting indicates that data access should be enabled. The base station 840 sends a directive periodically (within a pre-set time frame), instructing a processor 180 to maintain the switch setting to "on" for another thirty seconds. A base station is programmed to intercept access requests to the phone and check this switch 104 whenever it receives the request. If the switch 104 is set to the "on" position, the requests are routed to the phone as usual.

However, once the pre-determined interval of time elapses (thirty seconds) and the tag 150 has not received any signal from the base station 840, the microprocessor 180 re-sets the switch 104 to indicate that access should be denied. Now when the base station checks the switch 104, it will find that the switch 104 is set to a setting indicating that no access should be allowed (disable mode); therefore, no requests will be routed to the phone 100. This effectively renders the phone 100 useless. This will occur whenever the phone 100 is out of range of the base station 840 because the tag 150 cannot receive transmissions from the base station 840 if it is outside of the protected region 800.

To further secure the data in the phone 100, programming could ensure that once the switch 104 has been set to "disable" mode, it cannot be reset by anyone other than an administrator. This will prevent a situation where the phone 100 is removed from a secure area 800, its contents are tampered with, and then the phone 100 is returned to the secure area 800. This timing embodiment may be the easiest and cheapest to implement because it does not require the use of a monitoring station, just the strategic placement of field antennas and a base station. Those with knowledge in the art can appreciate that the switch 104 may be manual, or electronic, and that it may be a combination of switches and the switches may have multiple settings for different levels of access. Those with knowledge in the art will also appreciate that the switch 104 may be placed outside of the tag 150 and still be activated by the tag 150.

The choice of radio frequencies for transmitting and receiving in the secure region is important. A low radio frequency such as 150 kHz can be used for the interrogation signal at the base stations to prevent interference from metals and liquids which may be present in the protected region 800. Operating at such a low frequency allows for transmission of signals in harsh environments. The tag 150 may use the lower frequency (150 kHz) to emit signals to the field antennas or to other devices.

Referring now to FIG. 11 there is shown a flow chart detailing a method of exit control according to another method embodiment of the present invention. In the method of FIG. 11, the first step 1110 is the same as step 910 of FIG. 9. In step 1120 a visibility portal is installed at each exit to the protected region. In step 1130 the phone 100 passes through the portal or approaches the portal. Next, in step 1140 the monitoring station 880 or computer receives a transmission that the device 100 is exiting the secure area.

At this point, in optional step 1150, an audio/visual system located within the portal may be prompted to deliver a warning to the person carrying the phone. The warning may be in the form of an audio alert, such as "Warning! Leaving restricted area" or a text display, flashing light, or any other attention-getting presentation. If the phone 100 continues to exit the protected region 800 access to it is disabled in step 1160. The tag 150 itself may emit a warning signal when within range of the portal. The tag 150 may be programmed to emit a warning signal when attempting to download material in an area where access is restricted or if the phone 100 is removed from the monitored area 800.

There are many circumstances where it may be practical to restrict access to the data without destroying the data. One way to do this is to restrict access to the data by requiring the user to provide a security code. This is done by configuring the device 100 so that any data access requests to the laptop 100 are first routed through the security program 190. The programming in the laptop 100 may require the user to enter a security code, which is then verified by the security program 190. The security code can then be changed without the user's knowledge if the device 100 leaves the protected region 800. Another way to do this is to periodically update the security code and transmit it to the tag 150 only if the tag 150 answers an interrogation signal.

Another way to restrict data access without destroying the data is easily done by using a conventional encryption/decryption method. An administrator generates a key and then provides a copy 101 of that key to the security tag 150. The key 101 may be stored in a security program area 190, along with the encryption algorithm 102 used to encrypt the data. The key 101 is available to automatically decrypt the data while the phone 100 is within the protected region 800. If the phone 100 leaves the protected region 800, a signal is sent to the microprocessor 180 to destroy the key 101. The data itself is still safe within the phone 100. At this point only the administrator is able to access the data, using the original key. Note that this method will only work if a controller has been programmed to intercept any requests and query the tag 150.

According to another embodiment of the present invention, the device 100 may contain a separate battery 112 as shown in FIG. 12. This battery 112 has only one use. It remains off until it is activated by the microprocessor 180, which is configured to receive a specific signal. Once this battery 112 has been activated by the microprocessor 180, the battery 112 operates a squib device 185, destroying the data in the phone 100. The tag 150 is operable to receive a plurality of signals to allow the microprocessor to drive many input/output devices, including one to start a data delete response. These signals may be transmitted at different radio frequencies. One radio frequency may be reserved for a data erase directive, one radio frequency may be used for an identification signal, while another radio frequency is used for all other directives. The tag 150 is operable to receive radio frequency signals varying in strength, some as low as 150 kHz.

Rather than using the battery 112 to power up a squib 185, the battery 112 may also be used to set the switch 104. In one embodiment, when the switch 104 is in the "On" position, transmissions to the phone 100 are intercepted. As an added feature, an appropriate error message may be sent to a user. The switch 104 may also be activated by the microcontroller 180, instead of the additional battery 112.

Another way to keep track of the portable device 100 is by using global positioning system (GPS) signals. An optional GPS sensor 140 in the tag 150 can be used by a GPS system to locate the tag 150, thus locating the phone 100.

Therefore, while there have been described what are presently considered to be the preferred embodiments, it will be understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A combination of a security tag and a mobile phone for monitoring, tracing, and securing the mobile phone within a protected physical location, wherein the security tag is affixed to the mobile phone and comprises:

a tag antenna operable at a low radio frequency not exceeding one megahertz;

a tag transceiver operatively connected to the tag antenna, the transceiver operable to receive radio signals at the low radio frequency and generate data signals at the said low radio frequency, in response thereto;

a microcontroller operatively coupled with the transceiver, the microcontroller being configured to cause the transceiver to emit a signal when the mobile phone is exiting the protected physical region, and a memory having stored thereon a security program for controlling access to data stored in the mobile phone, wherein the security program permits access to stored data in the mobile phone when the mobile phone is within the protected physical region and restricts access to stored data in the mobile phone when the mobile phone is outside the protected physical region.

2. The combination of claim 1, further comprising a storage medium comprising a security program for causing the microcontroller to generate a signal when the mobile phone is moved out of the protected region.

3. The combination of claim 2, wherein some of the signals are transmitted at a low radio frequency not exceeding 150 kilohertz.

4. The combination of claim 2, further comprising an identification storage section, the identification storage section comprising identification data about the mobile phone, the identification data comprising a unique identifier associated with said mobile phone.

5. The combination of claim 4, wherein the microcontroller is configured to cause the tag transceiver to provide the signal when the mobile phone is exiting the protected region without a corresponding external security tag in proximity of the mobile phone.

6. The combination of claim 4, wherein the identification data comprises an internet protocol address, and wherein the microcontroller is operable for communication with an internet router using said internet protocol address, such that at least a portion of the identification data can be transmitted through the internet router to be viewable through a web browser at a remote location.

7. The combination of claim 4 wherein the identification data is inserted by the microcontroller upon receipt of a directive sent as a signal from a trusted source.

8. The combination of claim 4 wherein the identification storage section further comprises network identification data.

9. The combination of claim 8, wherein the security tag is operable to transmit and receive signals from other security tags within its network.

10. The combination of claim 1 wherein the transceiver is operable to emit a warning signal when the mobile phone is being removed from the protected region.

11. The combination of claim 1 further comprising at least one energy source.

12. The combination of claim 1 wherein the security program is embodied as an application specific integrated circuit.

13. The combination of claim 1 wherein the security program is embodied within the microcontroller.

14. The combination of claim 1 wherein the low radio frequency does not exceed 300 kilohertz.

15. The combination of claim 1 further comprising: a memory for storing data; and a timing device operatively connected to the transceiver, the timing device operable to: activate said transceiver at selected time intervals, and create timestamps that are tied to status events, wherein a temporal history of the status events can be stored in the memory.

16. The combination of claim 15 wherein the timing device comprises a crystal providing random phase modulation for enabling a selective read of a specific security tag within a network of security tags, without prior knowledge of its identification.

17. The combination of claim 15 further comprising at least one sensor for detecting at least one condition, wherein the at least one sensor is operable to emit an on-demand transmission signal when the at least one condition is detected and wherein the microcontroller is able to detect and read said signal from the at least one sensor, and further is able to take appropriate action based on the signal received.

18. The combination of claim 17 wherein the at least one sensor is a global positioning signal sensor for locating the mobile phone.

19. The combination of claim 18 further comprising: at least one switch, each switch comprising a plurality of modes, wherein the at least one switch remains set to enable mode for a predetermined interval of time, responsive to signals from a base station, and wherein the at least one switch is set to disable mode once the predetermined interval of time has elapsed.

20. The combination of claim 18 further comprising a heat-generating device for causing erasure of data in the mobile phone and wherein the microcontroller is further configured for actuating the heat-generating device in response to receiving an erase signal, said erase signal emitted if the mobile phone is removed from the protected region.

21. The combination of claim 18 wherein the at least one energy source is maintained in sleep mode until activated by the microcontroller to set a switch to indicate that access to the mobile phone should be restricted.

22. The combination of claim 18 wherein the at least one energy source is for activating a heat-generating device to destroy data in the mobile phone.

23. A method for securing data in a mobile phone within a protected physical region, the method comprising steps of:

configuring a signal generating system within the protected physical region, the signal generating system comprising at least one field antenna and a base station operable to generate a low frequency radio signal not exceeding one megahertz;

configuring the mobile phone with a security tag, the security tag comprising:

a low frequency transceiver, a microcontroller, an antenna operable at said low frequency, and a security program for secure use within the protected physical region;

monitoring the mobile phone within the protected physical region;

enabling user access to the mobile phone and data stored therein when the mobile phone is within the protected physical region; and restricting user access to the mobile phone and data stored therein when the mobile phone is outside of the protected physical region.

24. The method of claim 23 further comprising installing a portal comprising a router, a loop antenna, and a processor at an exit from the protected physical region, wherein said portal communicates with the security tag.

25. The method of claim 24 further comprising emitting a warning when the mobile phone is in close proximity to the portal.

26. The method of claim 25 further comprising the portal emitting a warning when the mobile phone attempts to exit the protected region without a corresponding external security tag in close proximity to the mobile phone.

27. The method of claim 26 further comprising steps of:

the portal checking data contained in the external security tag;

comparing the data to identification data from the security tag; and emitting a warning if the two sets of data do not match.

28. The method of claim 23 further comprising:

installing a heat-generating device, said heat-generating device operable by the microcontroller, wherein erasure of the data in the mobile phone is accomplished by activating the heat-generating device to release energy sufficient to destroy the data, and wherein the heat-generating device is activated when the mobile phone is removed from the protected region.

29. The method of claim 23 wherein the base station transmits interrogation signals to the security tag and waits for a timely response from the security tag, and wherein user access to the mobile phone is restricted when the timely response is not received at the base station.

30. The method of claim 29 wherein the interrogation signals are transmitted periodically.

31. The method of claim 23 further comprising transmitting interrogation signals to the security tag with the at least one field antenna.

32. The method of claim 23 further comprising using the security tag for transmitting identification signals to the base station at timed intervals and if the base station fails to receive an identification signal at the timed interval, the base station transmits a signal restricting access to the data in the mobile phone.

33. The method of claim 23 further comprising steps of:

loading an encryption/decryption program in the security tag, along with a key, and restricting user access by transmission of a signal to the microcontroller causing said microcontroller to modify the key.

34. The method of claim 23 wherein restricting user access further comprises requiring the user to provide a security code transmitted by the base station and changing said security code if the mobile phone is removed from the protected region.

35. The method of claim 34 wherein the security code is updated periodically and wherein the updated security code is transmitted to the security tag only if the mobile phone is within the protected region.

36. The method of claim 23 wherein the security tag is configured to emit a warning signal when it is removed from the protected region.

37. The method of claim 23 wherein the step of configuring the mobile phone comprises installing a battery in the security tag, said battery being in a sleep state until activated by the microcontroller, wherein activating the battery causes a release of energy, the energy destroying data in the mobile phone.

38. The method of claim 37 further comprising a step of:

installing a squib device in the security tag, wherein the battery activates the squib device, and said squib device releases heat to destroy data in the mobile phone.

39. The method of claim 23, further comprising a step of locating the security tag device using global positioning system signals.

40. The method of claim 23, further comprising steps of:

installing a timing device in the security tag; and setting at least one switch, wherein the at least one switch remains set to enable mode for a predetermined interval of time, responsive to signals from the base station, and wherein the at least one switch is set to disable mode once the predetermined interval of time passes.

41. A system for tracking, monitoring, and securing at least one mobile phone within a protected physical region, the system comprising:

a networked security tag affixed to each mobile phone, the security tag operable to receive and transmit low frequency radio signals not exceeding one megahertz;

a base station operable to generate the low frequency radio signals throughout substantially an entirety of the protected physical region, the base station comprising logic circuitry, a radio modem circuit, and an antenna; and at least one field antenna for radiating the low frequency radio signals driven by the base station, wherein the security tag comprises:

a tag antenna;

a tag transceiver operatively connected to the tag antenna, the transceiver operable to receive radio signals at the low radio frequency and generate data signals at the said low radio frequency, in response thereto;

a microcontroller operatively coupled with the transceiver, the microcontroller being configured to cause the transceiver to emit a signal when the mobile phone is exiting the protected physical region; and a memory having stored thereon a security program for controlling access to data stored in the mobile phone when the mobile phone is within the protected physical region and restricting access to stored data in the mobile phone when the mobile phone is outside the protected physical region.

42. The system of claim 41 further comprising a computer for monitoring the at least one mobile phone.

43. The system of claim 41 further comprising a portal configured to read data from the security tag, the portal comprising a loop antenna, a router, and a processor.

* * * * *